(12) United States Patent
Hoffmann et al.

(10) Patent No.: US 7,691,943 B2
(45) Date of Patent: Apr. 6, 2010

(54) MOULDING COMPOUND AND METHOD FOR PRODUCTION THEREOF

(75) Inventors: Botho Hoffmann, Domat/Ems (CH);
Georg Stöppelmann, Bonaduz (CH);
Janos Kertesz, Hofheim (DE);
Hans-Gerhard Fritz, Uhingen (DE);
Fan Jin, Stuttgart (DE)

(73) Assignees: EMS-Chemie AG, Domat/Ems (SE);
Norma Germany GmbH, Maintal (DE)

( * ) Notice: Subject to any disclaimer, the term of this patent is extended or adjusted under 35 U.S.C. 154(b) by 346 days.

(21) Appl. No.: 11/643,947

(22) Filed: Dec. 22, 2006

(65) Prior Publication Data
US 2007/0232715 A1    Oct. 4, 2007

(30) Foreign Application Priority Data
Dec. 23, 2005    (EP)    .................... 05028288

(51) Int. Cl.
*C08L 77/00*    (2006.01)
*C08L 23/08*    (2006.01)

(52) U.S. Cl. ............................ 525/60; 525/57; 525/58; 525/66; 525/179; 525/183; 524/514

(58) Field of Classification Search .................. 525/57, 525/58, 60, 66, 179, 183; 524/514
See application file for complete search history.

(56) References Cited

U.S. PATENT DOCUMENTS

2006/0166762 A1*    7/2006    Kim et al.    ................... 473/374

FOREIGN PATENT DOCUMENTS

WO    2005/111143    * 11/2005

OTHER PUBLICATIONS

Office Action issued by the State Intellectual Property of People's Republic of China in the parallel Chinese patent application CN 200610170530.6 date of notification Nov. 6, 2009.

* cited by examiner

*Primary Examiner*—Ana L Woodward
(74) *Attorney, Agent, or Firm*—Millen, White, Zelano, Branigan, P.C.

(57) ABSTRACT

Moulding compound, comprising 30 to 80% by weight of a polyamide as a thermoplastic matrix and of a cross-linked, disperse elastomer phase which is bonded to the thermoplastic matrix and contains 10 to 69% by weight of an ethylene copolymer and also 1 to 10% by weight of a compatibility agent, selected from the compounds obtained by means of grafting of α, β, ethylene-unsaturated mono- and/or dicarboxylic acids or derivatives thereof on an ethylene-copolymer-polymer backbone, respectively relative to the moulding compound.

20 Claims, 3 Drawing Sheets

REM image of the PA12-EVA blend (GRILAMID L16A:LEVAMELT 500=50:47) from example 4 enlarged 1000x

MOULDING COMPOUND AND METHOD FOR PRODUCTION THEREOF

The invention relates to a moulding compound comprising a thermoplastic matrix and a cross-linked, disperse elastomer phase which is bonded to the thermoplastic matrix, the cross-linked elastomer phase comprising ethylene copolymers and also a compatibility agent based on grafted ethylene copolymers. The invention relates furthermore to a method for producing a moulding compound of this type.

Thermoplastic moulding compounds which comprise a thermoplastic matrix and a disperse elastomer phase are known from prior art. The properties of these material classes are determined in particular by the disperse elastomer phase.

In DE 103 45 043 A1, a composition containing a microgel is thus described which comprises a thermoplastic phase, i.e. comprising a thermoplastic material, and cross-linked microgels as disperse phase, these microgels having not been cross-linked by the effect of radiation. The cross-linkage of the microgels is thereby effected before incorporation in the matrix. In DE 103 45 043 A1, a thermoplastic elastomer composition is thus obtained by incorporation of microgels in the thermoplastic materials, in which elastomer composition the morphology adjustment of the dispersed phase is decoupled spatially and temporally from the production of the material.

In EP 0 469 693 A2, an impact-resistant polyamide moulding compound is furthermore disclosed, which is constructed from a thermoplastic matrix, namely partly crystalline polyamide and ethylene copolymers as disperse phase. Cross-linkage of the disperse elastomer phase is thereby not mentioned.

However, it has now been shown that the thermoplastic moulding compounds described in prior art, with respect to their physical properties, in particular with respect to chemical resistance, in particular here with respect to as low an oil swelling as possible, still do not have adequate results. As low an oil swelling as possible is important for many application cases, in particular in the field of automotive vehicles, in oil- or petrol-conducting systems.

Starting herefrom, it is the object of the present invention to propose novel thermoplastic moulding compounds, the moulding compounds, in particular in their physical properties, in particular with respect to oil swelling, having properties which are superior to the moulding compounds known from prior art. Furthermore, it is an object of the present invention to indicate a corresponding production method.

The object is achieved by the features of patent claim 1 with respect to the moulding compound and by the features of patent claim 14 with respect to the production method. The sub-claims reveal advantageous developments.

The moulding compound according to the invention is hence characterised in that the latter has a cross-linked, disperse elastomer phase which is bonded to the thermoplastic matrix. It is thereby essential in the present invention that the cross-linked, disperse elastomer phase contains 10 to 69% by weight of an ethylene copolymer and also 1 to 10% by weight of a compatibility agent, selected from the compounds obtained by means of grafting of α, β, ethylene-unsaturated mono- and/or dicarboxylic acids or derivatives thereof on an ethylene-copolymer-polymer backbone. Substantial importance is thereby assigned to the compatibility agent in the indicated weight quantities which relate respectively to the moulding compound.

The concentration of the polyamide is thereby 30 to 80% by weight, preferably 40 to 60% by weight and particularly preferred 45 to 55% by weight.

It has now been shown that a moulding compound which, like one described above, has a bonded, cross-linked, disperse elastomer phase, is revealed to be superior in its physical properties in particular with respect to oil swelling in a significant manner relative to those which are known in prior art. Furthermore, it is thereby surprising that the further physical properties of the moulding compound according to the invention, such as impact strength, breaking stress, modulus of elasticity and breaking elongation are not influenced unfavourably as a result.

In the case of the moulding compound according to the invention it is thereby essential that the indicated weight ratios are maintained with respect to the compatibility agent. Too high quantities, i.e. quantities above 10%, obviously lead to cross-linkage of the polyamide phase, as a result of which the disperse elastomer phase has larger particles, which leads to an increase in oil swelling. Smaller quantities, i.e. quantities below 1% by weight, likewise lead to unsatisfactory results. It is therefore preferred in the case of the moulding compound according to the invention if the compatibility agent is added in a quantity of 1 to 7% by weight, particularly preferred in a quantity of 1 to 5% by weight.

In the polyamide-elastomer blend, parts of the compatibility agent are present both in the disperse elastomer phase and in the continuous polyamide phase. In both phases, a chemical linking takes place independently of each other. In the elastomer phase, the linking takes place in the framework of the radical cross-linkage, whereas in the polyamide phase the grafted functional groups of the compatibility agent react with the polyamide end groups. Furthermore, the functional groups of the compatibility agent which are present at the surface of the disperse phase also react with the end groups of the polyamide matrix. The last-mentioned reaction ensures good bonding of both phases which is required for the generation of the desired properties.

If in the moulding compound according to the invention, as described above, the indicated weight quantities are maintained with respect to the compatibility agent, a uniform particle diameter is achieved for the dispersed phase, said diameter being in the range of 0.2 to 3 μm. The superior properties of the moulding compound according to the invention can obviously be attributed in particular to this uniform particle size distribution of the disperse phase in the indicated range of 0.2 to 3 μm, preferably in the range between 0.5 μm to 3 μm. The control of the particle size is thereby effected, with respect to material, as cited above, by the added quantity of compatibility agents.

Furthermore the particle size is influenced by the method parameters and, as reported in the following, by the rheological conditions during production of the blend.

With respect to the adjustment of the morphology, great significance is thereby assigned to the viscosity ratio polyamide/elastomer. The size of the characteristic ratio $\lambda_3/\lambda_1$ is thereby important:

with $\lambda_3 = \Phi_{DP}/\Phi_{CP}$ and $\lambda_1 = \eta_{DP}/\eta_{CP}$ $\lambda_3$ representing the volume concentration ratio and $\lambda_1$ the ratio of the complex viscosities. DP stands for the disperse (elastomer) and CP for the continuous phase (polyamide).

If the viscosities of polyamide and ethylene copolymer are at the correct ratio, a representative shear speed can be found by suitable choice of the screw design with mixing elements and kneading blocks, which speed enables sufficient dispersing of the elastomer phase under the given conditions. If the characteristic ratio is $\lambda_3/\lambda_1 < 1$, a two-phase system is formed which contains the copolymers as microdispersely distributed phase within a continuous PA matrix.

It must always be ensured during the dynamic cross-linkage that the viscosity of the elastomer phase increases constantly due to the cross-linkage process which proceeds in parallel. Whereas the volume concentration ratio remains constant in this process, the viscosity ratio is displaced to greater values due to the cross-linkage of the dispersely distributed phase. If the condition $\lambda_3/\lambda_1<1$ is fulfilled already at the beginning of the process, the preconditions for a favourable dispersion are improved even more, i.e. it is even easier to obtain fine, microdispersely distributed and highly cross-linked particles of the elastomer phase in the PA matrix.

For the rheological examinations of the samples, a rotational rheometer of the type Rheometrics DSR 800 was used.

Storage and loss modulus and the complex viscosity were determined at a respectively constant temperature (200 to 250° C.) in the frequency range between $10^{-2}$ and $10^3$ (rad/s).

Methods for determining the complex viscosity are found in:

Flow behaviour of materials and material mixtures, Hüthig & Wepf Press Basel—Heidelberg—New York, 1986.

The moulding compounds according to the invention contain cross-linked, finely disperse elastomer phases which have a gel proportion of at least 60%, preferably at least 80% and particularly preferred of greater than 90%.

The gel proportion of the compatibility agents which is accessible by grafting is preferably less than 5% and particularly preferred less than 1%.

The moulding compound according to the invention is preferably obtainable in that the cross-linkage of the disperse elastomer phase was produced radically "in situ". For this purpose, the educts, i.e. the polyamide, the ethylene copolymer and the compatibility agent preferably with a radical initiator are hence mixed with a peroxide initiator and then the cross-linkage is implemented during the mixing. Alternatively it is also possible that only the educts, i.e. the polyamide, the copolymer and the compatibility agent, are mixed firstly and that then a cross-linkage is effected subsequently during the mixing or also at the end of the granulate formation or moulding part formation, by means of the introduction of energy-rich radiation.

From a material point of view, the present invention, with respect to the polyamides, comprises all the polyamides which are known per se in the state of the art and are suitable for producing a thermoplastic matrix.

As polyamides (PA), advantageously polyamides based on $C_6$-$C_{12}$ lactams or ω-amino carboxylic acids with 4 to 18 carbon atoms, preferably 6 to 12 carbon atoms, or polycondensates are used, obtainable from the polycondensation of at least one diamine from the group of aliphatic diamines with 4 to 18 C-atoms, of the cycloaliphatic diamines with 7 to 22 C-atoms in combination with at least one dicarboxylic acid from the group comprising aliphatic dicarboxylic acids with 4 to 44 C-atoms, cycloaliphatic dicarboxylic acids with 8 to 24 C-atoms and aromatic dicarboxylic acids with 8 to 20 C-atoms. The ω-amino carboxylic acids or the lactams are selected from the group comprising ε-aminocaproic acid, 11-aminoundecanoic acid, 12-aminododecanoic acid, ε-caprolactam, enantholactam, laurinlactam. In addition, according to the invention it is possible to use mixtures of such polymers or polycondensates. Diamines which are suitable according to the invention and are combined with a dicarboxylic acid are for example, 2,2,4- or 2,4,4-trimethylhexamethylenediamine, 1,3- or 1,4-bis(aminomethyl)cyclohexane, bis(3-methyl-4-aminocyclohexyl)methane, bis(p-aminocyclohexyl)methane, m- or p-xylylenediamine, 1,4-diaminobutane, 1,5-diamino-2-methylpentane, 1,6-diaminohexane, 1,8-diaminooctane, 1,9-diaminononane, 2-methyl-1,8-diaminooctane, 1,10-diaminodecane, 1,12-diaminododecane and the dicarboxylic acids are selected from the group of succinic acid, glutaric acid, adipinic acid, suberic acid, pimelic acid, octanedioic acid, azelaic acid, sebacic acid, dodecanedicarboxylic acid, octadecanedicarboxylic acid, 4-cyclohexanedicarboxylic acid, terephthalic acid, isophthalic acid and the napthalenedicarboxylic acids.

Concrete examples of (co)polyamides for the moulding compounds according to the invention are therefore homo- or copolyamides from the group comprising PA 6, PA 66, PA 11, PA 46, PA 12, PA 1212, PA 1012, PA 610, PA 612, PA 69, PA 6T, PA 6I, PA 9T, PA 10T, PA 12T, PA 12I, the mixtures or copolymers thereof based on the monomers used. According to the invention, also copolyamides PA 12T/12, PA 10T/12, PA 12T/106 and PA 10T/106 are preferred. Furthermore, e.g. PA 6/66, PA 6/612, PA 6/66/610, PA 6/66/12, PA MACMI, PA MACMT, PA 66/6I/6T, PA MXD 6/6, PA 6T/66, PA 6/6T, PA 6/6I, PA 6T/6I, PA 6I/6T or mixtures thereof are likewise preferred moulding compounds.

The polyamide moulding compounds according to the invention can however also contain polyamide block copolymers which contain polyester, polyether, polysiloxane, polycarbonate, polyacrylate, polymethacrylate or polyolefin segments as further components in addition to a proportion of at least 20% polyamide components. As representatives of this polymer class, polyetheramides, polyetheresteramides and polyesteramides may be mentioned, PA 12 being particularly preferred as polyamide segment.

In the case of the ethylene copolymers, there are preferably used as comonomers propene, butene, pentene, hexene, octene, decene, undecene, butadiene, styrene, acrylonitrile, isoprene, isobutylene, derivatives of (meth)acrylic acid, vinylacetate, tetrafluoroethylene, vinylidenefluoride, hexafluoropropene and 2-chlorobutadiene.

In the case of the ethylene copolymers, those are particularly preferred in which an ethylene vinylacetate copolymer (EVA) is used. The EVA copolymers preferably have a vinylacetate content of 20 to 80%, preferably from 30 to 70%, in particular from 40 to 60%. Also partly saponified EVA copolymers can thereby be used, in which the degree of saponification is maximum 50%. The EVA copolymers can also contain yet further comonomers.

In the case of the compatibility agents based on an ethylene copolymer, there are used as comonomers to ethylene preferably propene, butene, pentene, hexene, octene, decade, undecene, butadiene, styrene, acrylonitrile, isoprene, isobutylene, derivatives of (meth)acrylic acid, vinylacetate, tetrafluoroethylene, vinylidenefluoride, hexafluoropropene and 2-chlorobutadiene.

With respect to the compatibility agent it is preferred if the polymer backbone is likewise an ethylene vinylacetate copolymer (EVA). Suitable graft reagents are maleic anhydride, (meth)acrylic acid, glycidyl(meth)acrylate, butyl (meth)acrylate and also methyl(meth)acrylate. Preferred thereby is maleic anhydride (MAH). In the case where polyamide-EVA blends are used with a compatibility agent based on an EVA polymer backbone and MAH as graft reagent, there are suitable as compatibility agent the commercial MAH-grafted ethylene vinylacetate copolymers, such as e.g. FUSABOND MC190D (0.76% MAH) or MC250D (1.38% MAH) by DuPont Co., Europe.

Preferred compatibility agents based on a BVA polymer backbone have the preferred properties as follows:
Vinylacetate content: >35% by mol
MVI: (190° C./2.16 kg)>20
Graft degree: 0.2 to 3% (in particular 0.5 to 1.5%)
Gel proportion: <5%, preferably <1%

Of course the thermoplastic polyamide moulding compounds according to the invention can contain in addition normal additives which are in general known to the person skilled in the art, alone or in combination and which are selected from the group comprising impact-resistance agents, foreign polymers, adhesives, fireproofing agents, reinforcing agents, such as glass and C-fibres, UV or heat stabilisers, stabilisers against weathering, minerals, processing aids, crystallisation accelerators or inhibitors, antioxidants, anti-blocking agents, lubricants, mould-release agents, flame-proofing agents, pigments, colourants and marking materials and fillers, such as carbon black or graphite, carbon-nanofibrils or also nanoparticles in flake-shape, corresponding to all the additives which are known for polyamides, as are necessary for the respective application.

Also other normal polymers, such as polyesters, polyolefins, polycarbonates, AN- and ABS-polymers, functionalised copolyolefins and ionomers can be added to the previously described moulding compounds for specific purposes.

As further additives, impact modifiers are added to the thermoplastic polyamide moulding compounds according to the invention. These are e.g. copolymers based on polyolefin of low glass conversion temperature, which contain acrylic acid or can be grafted with maleic anhydride. In particular impact modifiers such as ethylene-propylene copolyolefins or ethylene-propylene-diene rubbers (EPDM) or acrylate rubbers may be mentioned in particular here.

In preferred embodiments, the moulding compounds contain in addition nanoscale fillers. In a particular embodiment of the invention, the nanoscale fillers are either silicon dioxide or silicon dioxide hydrates. In the polyamide moulding compound specific nanoscale fillers are present in one embodiment as a uniformly dispersed layer-shaped material. Before incorporation into the matrix, they have a layer thickness of 0.7 to 1.2 nm and an intermediate layer spacing of the mineral layers of up to 5 nm.

The invention relates furthermore to a method for producing a moulding compound as described above (patent claim 14).

The method according to the invention is now characterised in that the educts for producing the moulding compound i.e. the polyamide, the copolymer and also the compatibility agent, are mixed in a mixing unit and in that cross-linkage of the disperse elastomer phase is implemented. The cross-linkage of the disperse elastomer phase can thereby be effected fundamentally in two different ways.

On the one hand, it is possible to implement the cross-linkage such that, with the addition of the educts for producing the moulding compound, i.e. with the polyamide, with the copolymer and also with the compatibility agent, a radical initiator, preferably a peroxide initiator is added at the same time. By the addition of this initiator during the production process, not only cross-linkage of the disperse elastomer phase is thus effected but at the same time bonding of the elastomer phase to the polyamide, namely in that the compatibility agent reacts chemically via the grafted functional groups with the end groups of the polyamide. As a result of this "in situ" cross-linkage of the disperse phase, a uniform particle size of the disperse phase is obviously achieved in the indicated size range, i.e. in sizes of >0.2 to 3 μm, preferably from >0.5 μm to 3 μm. It should be emphasised in the method according to the invention that as a result of the "in situ" reaction, a uniform particle size distribution is achieved which, as already shown above, is crucial for the physical properties of the moulding compound according to the invention.

As an alternative, it is also possible to implement the cross-linkage not with a peroxide initiator but to achieve a corresponding cross-linkage by the introduction of energy. The advantage of this variant can be seen in the fact that the cross-linkage can be implemented during the mixing process but also only after formation of the polymer granulate or of the moulded part. In the case of the method according to the invention, all mixing units are suitable fundamentally as mixing unit, such as e.g. rollers, multiroller units, dissolvers, intimate mixers or mixing extruders. However twin-screw extruders are preferred as mixing units, here again twin-screw extruders being favourable which have conveying elements with a low helix and also spatially separated graduated kneading blocks. The screw speed of such a twin-screw extruder is preferably 150 to 400 $min^{-1}$. The temperature of the feed zone should be <120° C.

The invention relates furthermore to the use of the moulding compounds according to the invention for producing thermoplastically processible moulded articles and also the moulded articles which can be obtained from the compositions according to the invention.

Examples of moulded articles of this type include: plug connections, damping, in particular oscillation and impact damping elements, acoustic damping elements, profiles, films, in particular damping films, packaging films or individual layers of multilayer packaging film, foot mats, shoe inserts, boots, in particular ski boots, ski uppers, shoe soles, electronic components, housings for electronic components, tools, decorative moulded articles, composite materials etc.

The moulded articles include in particular: fluid-conducting pipes (gases and/or liquids), in particular oil- and fuel-conducting pipes, pipes with antistatic finishes and containers for the car industry, smooth and undulating pipes, pipe sections, pipe connection pieces (inlet, venting, filling, discharge), flexible hoses, fittings for connecting hoses, corrugated pipes and media-conducting pipes, component of multilayer pipes (exterior, intermediate, interior layer), containers, parts of containers (e.g. closures), individual layers of multilayer containers, covers or crank housing parts in the car industry, hydraulic pipes, brake pipes, brake fluid containers, coolant pipes. The moulded parts can be produced by the methods of injection moulding, extrusion or blow-moulding.

The invention is explained subsequently in more detail with reference to examples and Figures.

EXAMPLES

PA12-EVA-blend Generation by Means of a Megacompounder (ZSK 40)

The PA12-EVA blend production is explained firstly in the framework of a two-stage method. In the first partial step, the grafting of the maleic anhydride (MAH) onto the EVA copolymer is effected, the compatibility agent being produced. In the second partial step, the dynamic cross-linkage of the synthetic rubber phase is effected with simultaneous formation of the sought morphology.

With a PA12-EVA mass concentration ratio of 50:50 and also by establishing a viscosity ratio, as occurs with a screw speed of $n=300$ min$^{-1}$, thermoplastic elastomer blends are produced which comprise a continuous PA12 matrix and highly cross-linked EVA particles embedded therein. For intensification of the PA12-EVA interactions, the pre-prepared EVA-g-MAH is added as compatibility agent to the component system. The PA12-EVA blends are prepared with the help of a twin-screw extruder, rotating in the same direction, type ZSK 40 L/D=56 by the company Coperion Werner & Pfleiderer. The polymers used are characterised in more detail in Table 1.

Method Step 1: Grafting of the EVA Copolymer with MAH

Example 1

In the first method partial step, the radical grafting reaction of condensable MAH onto the EVA copolymer takes place. The produced process parameters are compiled in Table 2. MAH and 2,5-di(tert-butyl-peroxy)-2,5-dimethylhexane (DHBP) are pre-mixed with the EVA. The materials are supplied continuously to the twin-screw extruder ZSK 25–L/D=44 by means of a gravimetric metering system. To 2.0 parts MAH 0.2 parts DHBP are added. The screw speed was 150 min$^{-1}$.

The resulting graft copolymer is characterised in Table 1

TABLE 1

Polymers used

| Polymer | Density (p20° C.) (g/cm$^3$) | Melting point Tm (° C.) | Breaking stress (MPa) | Breaking elongation (%) | Modulus of elasticity (MPa) | Shore A (D) | MVI (ml/10 min) | Special properties |
|---|---|---|---|---|---|---|---|---|
| Levamelt 500 | approx. 1 | 40 | 5 | 1000 | — | 33 (A) | 7.6 (230° C./ 2.16 kg) | VA = 50 ± 1.5 % by wt. |
| GRILAMID L16A (PA12) | 1.01 | 178 | 50 | 200-300 | 1100 | 70 (D) | 65 (230° C./ 2.16 kg) | NH$_2$-end groups = 100 µeq/g |
| EVA-g-MAH (Example 1) | 0.96 | 50 | 5 | 1000 | — | 46 (A) | 21 (190° C./ 2.16 kg) | VA = 40 ± 1.5 % by wt.; MAH = 0.7% by wt. |

VA = Vinylacetate concentration; MAH = maleic anhydride

TABLE 2

General housing desired temperature for the grafting reaction of EVA copolymers

| | Cylinder number | | | | | | | | | | |
|---|---|---|---|---|---|---|---|---|---|---|---|
| | 1 | 2 | 3 | 4 | 5 | 6 | 7 | 8 | 9 | 10 | 11 |
| Temperature profile [° C.] | 100 | 150 | 180 | 200 | 200 | 200 | 190 | 190 | 180 | 180 | 170 |

Rheological tests, which include the physical characteristic functions of storage modulus (G'(ω)), loss modulus (G"(ω)) and complex viscosity η*(ω)), show unequivocally that the MAH-grafted EVA copolymer, generated with 2.0% MAH and 0.2% DHBP (MAH:DHBP=10:1), still as a thermoplastic deformation behaviour and hence no peroxide-initiated EVA pre-cross-linkage has taken place.

Determination of the MAH Graft Degree

The MAH graft degree is determined by determining the oxygen content (CHN analysis) of the EVA-g-MAH.

$[O]_{total} - [O]_{EVA} = [O]_{grafted\ MAH}$ $[O]_{grafted\ MAH} \times [(C+H)/O]_{MAH} = [C+H]_{grafted\ MAH}$ MAH graft degree $= [MAH]_{EVA-g-MAH} = [O]_{grafted\ MAH} + [C+H]_{grafted\ MAH}$ Determination of the Gel Proportion The gel proportion of the cross-linked EVA phase and the compatibility agent EVA-g-MAH were determined by hot-extraction with chloroform. In addition, the samples were extracted for 15 h in boiling chloroform with reflux. After separation of the insoluble proportion, the latter was dried until of a constant weight and then was weighed out. The weight proportion of the insoluble residue relative to the initial weight produces the gel proportion in %.

The graft degree of the produced EVA-g-MAH is 0.7%, the gel proportion <1%.

Method step 2: Reactive Compatibilisation and Dynamic EVA Cross-linkage and Morphology Formation of the PA-EVA Vulcanisates Examples 2-4

The generation of the PA12-EVA blend was produced by means of a twin-screw extruder, Type ZSK 40-L/D=56, which rotates in the same direction and is tightly meshing. In the case of the method concept put into practice, the reactive compatibilisation process is combined with the blend generation to form a one-stage process. In order to complete the linking reaction between the EVA-g-MAH and the amino end groups of the PA12 or the dynamic cross-linkage of the disperse phase of the PA12-EVA blend, conveying elements were installed which have a low helix and also spatially separated, graduated sets of kneading blocks.

Due to this measure, the filling degree of the screw channel and hence the dwell time of the components in the extruder and also the shear effect of the screw are increased.

Figure 1:
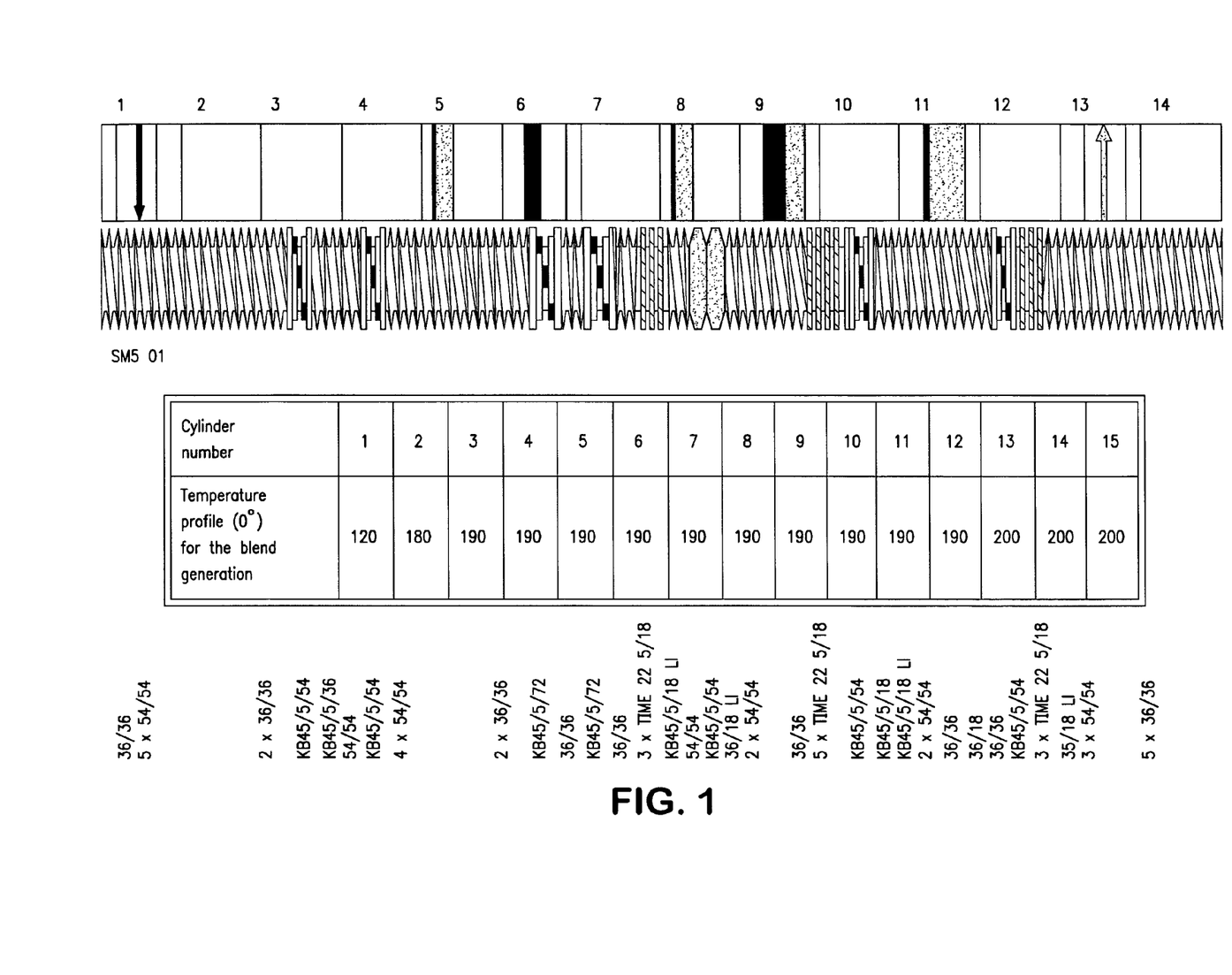
FIG. 1 shows a screw plan for an extruder.

An axial cylinder temperature profile which is typical for generation of such blends and also the screw geometry used are represented in FIG. 1. The screw speed was 290 min$^{-1}$. The temperature of the feed zone must be kept as low as possible because the cross-linking agent can evaporate at higher temperatures.

The EVA copolymer, the compatibility agent (EVA-g-MAH) and the PA12 are supplied gravimetrically by means of two gravimetric metering systems to zone 1 of the extrusion machine. The cross-linking agent was metered into the extruder by means of a micrometering unit and was distributed homogeneously at a low mass temperature (160° C.<Tm<180° C.) in order to avoid a spontaneous peroxide degradation in the basic components. Due to the choice of an adequate axial cylinder temperature profile, the plastifying temperature increases in the conveying direction, the thermally initiated peroxide decomposition begins. A peroxide-initiated radical vulcanisation of the disperse phase and the separation and distribution process and also the compatibilisation process of the molten polymer components lead to a polymer blend which contains the synthetic rubber phase in the cross-linked, finely disperse state.

The cross-linkage reaction should take place under the effect of high deformation stresses and deformation speeds, in order that a continuing efficient separation or dispersion of the elastomer phase into the smallest particles (0.2≦dp≦3.0 μm) takes place. The process and method parameters required for this purpose can be produced by means of a modular screw design which contains precisely positioned mixing elements and wide intensive kneading blocks and simultaneously ensures local reaction-specific mass dwell times.

The characteristic viscosity ratio of the polymers used in examples 2 to 4—Grilamid L 16A and Levamelt 500—is $\lambda_3/\lambda_1 = 0.7$ In this estimation, the complex viscosities at a frequency of 100 rad/s formed the basis.

In Table 3 formulation batches are cited which were selected by way of example.

The blends comprising PA12 and EVA, in comparison to the non-cross-linked blends, reveal practically no disadvantages with respect to the mechanical properties. Modulus of elasticity, breaking stress and breaking elongation are in the same range and are almost independent of the cross-linkage degree of the elastomer phase. In contrast, the oil swelling with increasing cross-linkage degree of the EVA domain reduces significantly. With the same EVA proportion, the swelling degree of the blend (Example 4) is only 2.1% and hence is smaller than the non-cross-linked blend (Example 2) by a factor of 3.5.

TABLE 3

Formulations and properties of PA12-EVA blends which were produced with the ZKS 40 extruder.

| | Example | | |
|---|---|---|---|
| | 2<br>V50/47/3-L16-<br>EV50-EVA-g-MAH | 3<br>V50/47/3-L16-EV50-<br>EVA-g-MAH-DI 0.25 | 4<br>V50/47/3-L16-EV50-<br>EVA-g-MAH-DI 0.6 |
| Components | | | |
| EVA (Levamelt 500) | 47 | 47 | 47 |
| PA12 (GRILAMID L16A) | 50 | 50 | 50 |
| EVA-g-MAH | 3 | 3 | 3 |
| Peroxide DIPP | 0 | 0.25 | 0.60 |
| Properties | | | |
| Shore A, 15 sec | 94 | 95 | 95 |
| Modulus of elasticity, MPa | 541 | 432 | 474 |

TABLE 3-continued

Formulations and properties of PA12-EVA blends which were produced with the ZKS 40 extruder.

| | Example | | |
|---|---|---|---|
| | 2<br>V50/47/3-L16-<br>EV50-EVA-g-MAH | 3<br>V50/47/3-L16-EV50-<br>EVA-g-MAH-DI 0.25 | 4<br>V50/47/3-L16-EV50-<br>EVA-g-MAH-DI 0.6 |
| Breaking stress, MPa | 26 | 26.6 | 24 |
| Breaking elongation, % | 192 | 150 | 179 |
| Oil swelling degree, DIN 53521 IRM 903 oil, 70° C./22 h, % | 7.3 | 5.1 | 2.1 |
| MVI, 230° C./10 kg, ml/10 min | 27.8 | 46 | 16.9 |

The particle diameter of the dispersed phase reduces by a factor 3 with addition of EVA-g-MAH. Without compatibility agents, a non-uniform size distribution in the range 3-10 μm results, the proportion of larger particles predominating. By addition of the compatibility agent EVA-g-MAH, a significantly more uniform distribution of the particle diameters in the range between 0.2 and 3 μm results.

Figure 2:
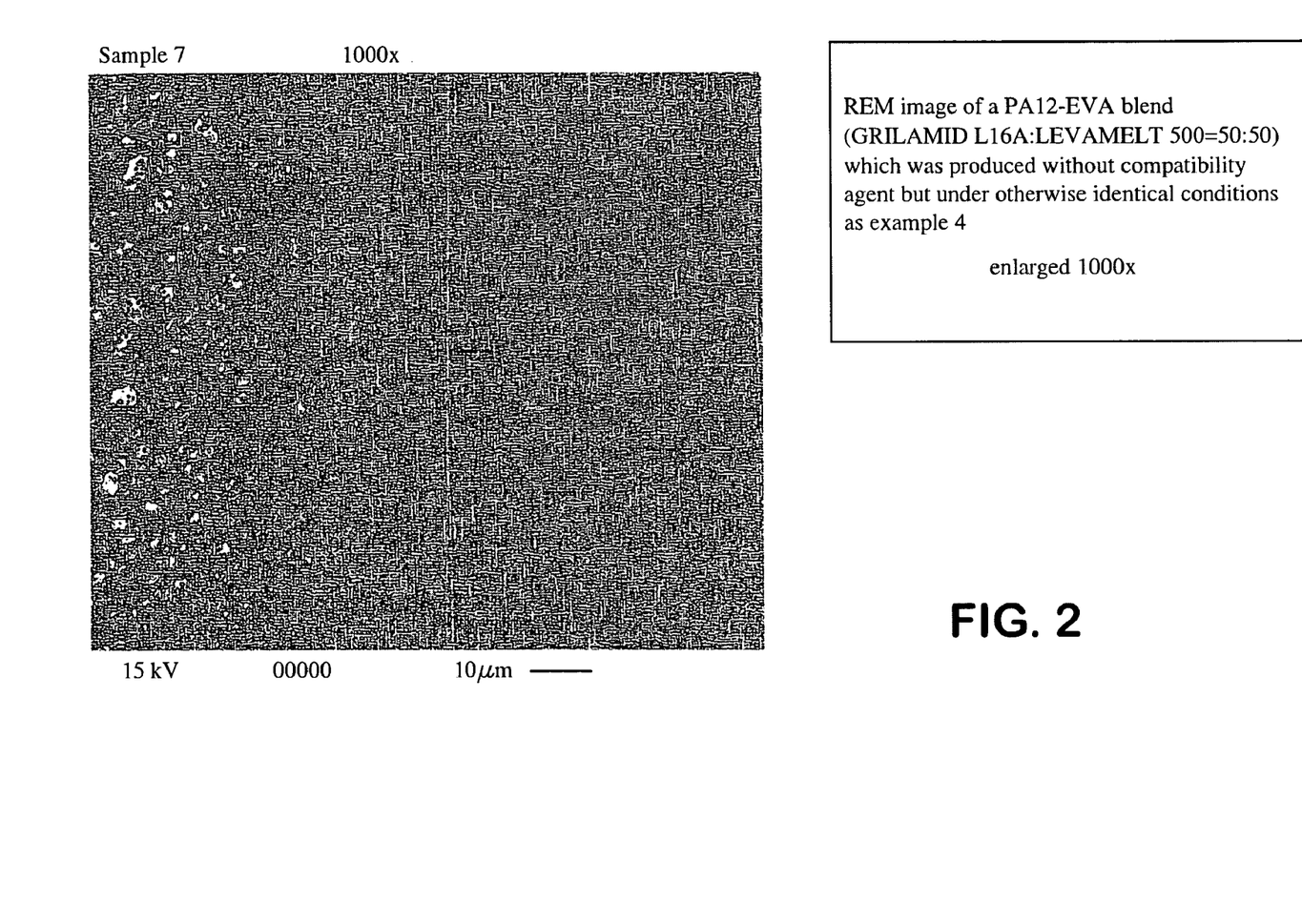
FIGS. 2 and 3 show REM images of polymer blends.
Figure 3:
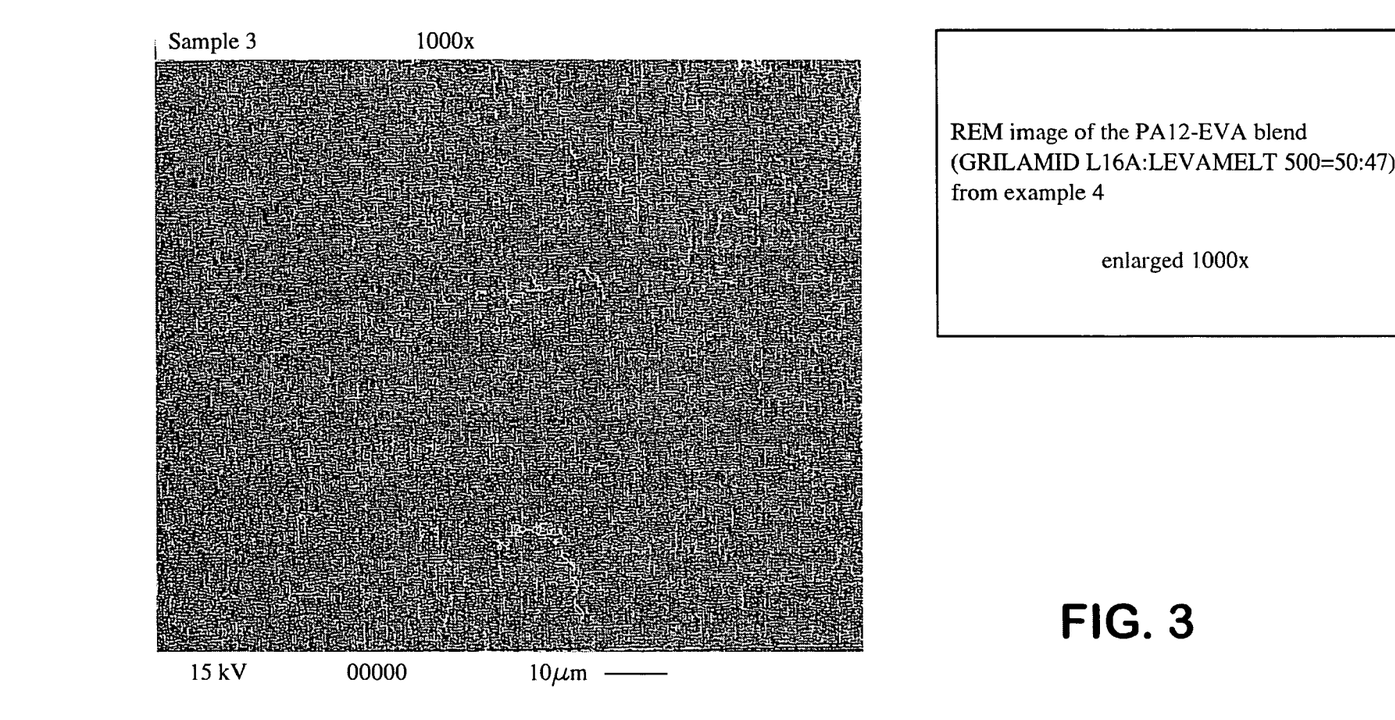

The influence of the compatibility agent can be verified by means of the REM images which are reproduced in FIGS. 2 and 3. FIG. 2 shows, enlarged 1000 times, the morphology of a PA12-EVA blend (GRILAMID L16A:LEVAMELT 500=50:50) which was produced without compatibility agents but under the same conditions as example 4. The EVA particle size is for the most part significantly above 3 μm. In contrast thereto, FIG. 3 shows an REM image of the PA12-EVA blend of example 4, an elastomer phase with particle sizes significantly below 3 μm which are distributed homogeneously over the observed section. Large elastomer regions in the form of agglomerates do not occur.

Close attention should however be paid to the concentration of the compatibility agent used since too high a concentration leads to cross-linkage of the polyamide phase. As a result of the formation of larger particles, the oil swelling then increases.

The compatibility agent, like e.g. EVA-g-MAH, is used in a concentration of 1-10% by weight, preferably from 1 to 7% by weight and especially preferred from 1 to 5% by weight, relative to the moulding compound.

In the following Table 4, various peroxides are listed which are suitable for the production of the moulding compound according to the invention.

Particularly efficient for the EVA cross-linkage are the peroxides DHBP and DIPP. Since EVA contains free acetic acid (up to 0.1% by weight), it is advantageous, with respect to the completeness of the EVA cross-linkage, to add magnesium oxide thereto as base for neutralisation. Without this addition, a part of the peroxide is decomposed heterolytically and is no longer available for the radical formation.

TABLE 4

The properties of peroxides which are suitable for EVA crosslinkage.

| Peroxides | Chemical structure | Half change value ($t_{1/2}$) | Active oxygen number | Mol mass (g/mol) |
|---|---|---|---|---|
| Peroxybenzoicacid-(2-methyl-2-butylester TAPB 90% | $H_3C-H_2C-\underset{CH_3}{\overset{CH_3}{\underset{|}{\overset{|}{C}}}}-O-O-\overset{O}{\overset{\|}{C}}-C_6H_5$ | 1 min (160° C.) | 7,68<br>Ea = 143<br>kcal/mol | 208,3 |
| Peroxybenzoicacid-tert-butylester TBPB | $CH_3-\underset{CH_3}{\overset{CH_3}{\underset{|}{\overset{|}{C}}}}-O-O-\overset{O}{\overset{\|}{C}}-C_6H_5$ | 1 min (166° C.) | 8.2<br>Ea = 34.1<br>kcal/mol | 194,2 |
| Dicumyl peroxide DCUP | $C_6H_5-\underset{CH_3}{\overset{CH_3}{\underset{|}{\overset{|}{C}}}}-O-O-\underset{CH_3}{\overset{CH_3}{\underset{|}{\overset{|}{CH}}}}-C_6H_5$ | 0.2 min (196° C.)<br>1 min (177° C.) | 5.9<br>Ea = 36.4<br>Kcal/mol | 270.4 |
| t-butylcumyl peroxide BCUP | $H_3C-\underset{CH_3}{\overset{CH_3}{\underset{|}{\overset{|}{C}}}}-O-O-\underset{CH_3}{\overset{CH_3}{\underset{|}{\overset{|}{C}}}}-C_6H_5$ | 0.2 min (196° C.)<br>1 min (180° C.)<br>1 h (140° C.) | 7,7<br>Ea = 154<br>KJ/mol | 208 |

TABLE 4-continued

The properties of peroxides which are suitable for EVA crosslinkage.

| Peroxides | Chemical structure | Half change value ($t_{1/2}$) | Active oxygen number | Mol mass (g/mol) |
|---|---|---|---|---|
| 2,5-di(tert-butyl-(peroxy)-2,5-dimethyl-hexane* DHBP | $(H_3C)_3C-O-O-C(CH_3)_2-CH_2CH_2-C(CH_3)_2-O-O-C(CH_3)_3$ | 1 min (190° C.) 6 min (159° C.) 10 h (119° C.) | 11.02 Ea = 39.1 Kcal/mol | 290.4 |
| 1,3-di(2-tert.-butylperoxyisopropyl)-benzene TBPDB or DIPP* | $(H_3C)_3C-O-O-C(CH_3)_2-C_6H_4-C(CH_3)_2-O-O-C(CH_3)_3$ | 1 min (190° C.) 10 h (119) | 9.45 | 338.5 |
| di-t-butylperoxide DTBP | $(H_3C)_3C-O-O-C(CH_3)_3$ | 1 min (190° C.) 1 h (146° C.) | 10,9 Ea = 152 kJ/mol | 146.2 |
| 2,5-bis-(tert.-butyl-peroxy)-2,5-dimethyl-3-hexyne DYBP | $(H_3C)_3C-O-O-C(CH_3)_2-C\equiv C-C(CH_3)_2-O-O-C(CH_3)_3$ | 1 min (193° C.) 10 h (128° C.) | 11.17 Ea = 154 kJ/mol | 286.4 |

Example 5

Analogously to example 3 and 4, a dynamically cross-linked PA12-EVA blend comprising the components GRILAMID L16A, LEVAMELT 500 and the compatibility agent EVA-g-MAH, produced in example 1, is generated. The oil swelling and the mechanical properties was determined on DIN tensile test bars.

Furthermore, with the blend from example 5, monopipes of the dimension 8×1 were produced with different withdrawal speeds on a Nokia Maillefer Coex5 pipe extruder. The cylinder temperatures were 200-220° C., the screw speed 75 rpm (40 m/s) or 112 rpm (60 m/s) and the mass temperature 217° C. For both withdrawal speeds (40 and 60 m/s), corresponding pipe properties were determined. The results are compiled in Table 5.

The comparative stress which is independent of the pipe dimensions is calculated from the rupture pressure as follows:

$$VS = \frac{P_B * d_m}{20 * s_{min}}$$

$P_B$=Rupture pressure [bar]
$d_m$=$d_1$−$s_{min}$, average pipe diameter [mm]
$d_1$=outer diameter [mm]
$s_{min}$=minimum pipe wall thickness [mm]
VS=comparative stress [MPa]

TABLE 5

| GRILAMID L16A NATUR | % by wt. | | | 50 |
|---|---|---|---|---|
| LEVAMELT 500 | % by wt. | | | 45 |
| Eva-G-MAH from Example 1 | % by wt. | | | 5 |
| Peroxide DHBP | % by wt. | | | 0.5 |
| Oil Swelling | | | | |
| Weight increase | DIN 53521 14 d, 23° C. IRM 903 oil | div | % by wt. | 1.35 |

TABLE 5-continued

| Mechanical properties | | | | |
|---|---|---|---|---|
| Modulus of elasticity | ISO 527 | dry | MPa | 400 |
| Yield stress | ISO 527 | dry | MPa | 13.2 |
| Yield elongation | ISO 527 | dry | % | 7.4 |
| Tear strength | ISO 527 | dry | MPa | 18.3 |
| Tear elongation | ISO 527 | dry | % | 154 |
| Impact strength Charpy | ISO 179, 23° C. | dry | kJ/m$^2$ | nb |
| Impact strength Charpy | ISO 179, −30° C. | dry | kJ/m$^2$ | nb |
| Notch-impact strength Charpy | ISO 179, 23° C. | dry | kJ/m$^2$ | nb |
| Notch-impact strength Charpy | ISO 179, −30° C. | dry | kJ/m$^2$ | 7.7 |
| Thermal Properties | | | | |
| MVR | 275° C./5 kg | dry | cm$^3$/10 min | 18 |
| Melting point | — | dry | ° C. | 177.5 |
| Melting enthalpy | — | dry | J/g | 28.6 |
| Crystallisation temperature | — | dry | ° C. | 156.2 |
| Crystallisation enthalpy | — | dry | J/g | 26.6 |
| Crystallisation speed | — | dry | J/g/min | 19.3 |
| Pipe extrusion 40 m/min | | | | |
| Diameter | external | dry | mm | 7.95 |
| Wall thickness | minimal | dry | mm | 0.89 |
| Rupture pressure | DIN 73378 (23° C.) | dry | bar | 30.1 |
| Rupture pressure | SAE J2260 (23° C.) ($ZnCl_2$) | dry | bar | 29.7 |
| Comparative stress | 23° C. | dry | MPa | 11.9 |
| Rupture pressure | DIN 73378 (115° C.) | dry | bar | 10.6 |
| Comparative stress | 115° C. | dry | MPa | 4.2 |
| Pipe extrusion 60 m/min | | | | |
| Diameter | external | dry | mm | 8.00 |
| Wall thickness | minimal | dry | mm | 0.90 |
| Rupture pressure | DIN 73378 (23° C.) | dry | bar | 30.6 |

TABLE 5-continued

| Rupture pressure | SAE J2260 (23° C.) (ZnCl$_2$) | dry | bar | 30.0 |
| --- | --- | --- | --- | --- |
| Comparative stress | 23° C. | dry | MPa | 12.1 |
| Rupture pressure | DIN 73378 (115° C.) | dry | bar | 11.0 |
| Comparative stress | 115° C. | dry | MPa | 4.3 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 05028288.8, filed Dec. 23, 2005 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A molding composition comprising: 30 to 80% by weight of a polyamide, relative to the total weight of the composition, as a thermoplastic matrix; a cross-linked, disperse elastomer phase which is bonded to the thermoplastic matrix, wherein said cross-linked, disperse elastomer phase contains 10 to 69% by weight of ethylene vinylacetate as ethylene copolymer, relative to the total weight of the composition; and 1 to 5% by weight of a compatibility agent, relative to the total weight of the composition, wherein said compatibility agent is selected from compounds obtained by means of grafting of α, β, ethylene-unsaturated mono- and/or dicarboxylic acids or derivatives thereof on an ethylene-co-polymer-polymer backbone.

2. A molding composition according to claim 1, wherein the average particle diameter of the cross-linked, disperse elastomer phase is in the range between 0.2 μm and 3 μm.

3. A molding composition according to claim 1, wherein the cross-linkage of the disperse elastomer phase is produced radically.

4. A molding composition according to claim 3, wherein the cross-linkage is implemented "in situ".

5. A molding composition according to claim 3, wherein a peroxide-initiated radical cross-linkage is implemented.

6. A molding composition according to claim 1, wherein the cross-linkage of the disperse elastomer phase is effected by means of the introduction of energy-rich radiation.

7. A molding composition according to claim 1, wherein, for said compatibility agent, the grafting of an α,β, ethylene-unsaturated mono- and/or dicarboxylic acid or derivative thereof on the ethylene-copolymer-polymer backbone is achieved via a graft reagent selected from maleic anhydride (MAH), (meth)acrylic acid, glycidyl(meth)acrylate, butyl (meth)acrylate, and methyl(meth)acrylate.

8. A molding composition according to claim 1, wherein a partly crystalline polyamide is used as said polyamide.

9. A molding composition according to claim 1, wherein the polyamide is selected from PA 6, PA 66, PA 11, PA 46, PA 12, PA 1212, PA 1012, PA 610, PA 612, PA 69, PA 9T, PA 6T, PA 61, PA 10T, PA 12T, PA 12I, mixtures thereof, or copolymers thereof.

10. A molding composition according to claim 1, further comprising additives.

11. A molding composition according to claim 1, wherein the volume concentration ratio $\lambda_3=\Phi_{DP}/\Phi_{CP}$ and the ratio of the complex viscosity $\lambda_1=\eta_{DP}/\eta_{CP}$ are in the following relationship: $\lambda_3/\lambda_1<1$, DP standing for the disperse phase, and CP for the continuous phase.

12. A method for producing a moulding composition according to claim 1, said method comprising: mixing the polyamide, the copolymer and also the compatibility agent in a mixing unit and implementing cross-linkage of the disperse elastomer phase.

13. A method according to claim 12, wherein the mixing unit is selected from rollers, multiroller units, dissolvers, intimate mixers or mixing extruders.

14. A method according to claim 13, wherein a twin-screw extruder is used as said mixing unit.

15. A method according to claim 12, wherein the cross-linkage of the disperse elastomer phase is effected by combining the polyamide, copolymer, and compatibility agent with a radical initiator.

16. A method according to claim 12, wherein the cross-linkage of the disperse elastomer phase is effected by means of the introduction of energy-rich radiation during or after formation of the moulding composition.

17. A molding composition according to claim 1, wherein the average particle diameter of the cross-linked, disperse elastomer phase is in the range between 0.5 μm to 3 μm.

18. A molding composition according to claim 1, wherein the cross-linked, finely disperse elastomer phase has a gel proportion of at least 60%.

19. A molding composition according to claim 1, wherein the compatibility agents has a gel proportion of less than 5%.

20. A molding composition according to claim 1, wherein the amount of the compatibility agent is 3 to 5% by weight of a, relative to the total weight of the composition.

* * * * *